United States Patent
Franchet et al.

(10) Patent No.: US 7,511,248 B2
(45) Date of Patent: *Mar. 31, 2009

(54) PROCESS FOR MANUFACTURING A BONDED SHEET COMPOSED OF CERAMIC FILAMENTS WITH A METAL MATRIX, DEVICE FOR IMPLEMENTING SAID PROCESS, BONDED SHEET OBTAINED BY SAID PROCESS

(75) Inventors: Jean-Michel Franchet, Paris (FR); Gilles Klein, Mery sur Oise (FR)

(73) Assignee: SNECMA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/420,658

(22) Filed: May 26, 2006

(65) Prior Publication Data

US 2006/0266741 A1 Nov. 30, 2006

(30) Foreign Application Priority Data

May 27, 2005 (FR) .................................. 05 51405

(51) Int. Cl.
*B23K 26/00* (2006.01)

(52) U.S. Cl. .............................. 219/121.64; 219/121.6; 219/87; 219/86.1; 29/419.1

(58) Field of Classification Search ............ 219/121.64, 219/62, 87, 86.1, 86.9, 121.6, 121.63; 29/419.1, 29/888.046; 156/296; 428/113
See application file for complete search history.

(56) References Cited

U.S. PATENT DOCUMENTS

| | | | | |
|---|---|---|---|---|
| 3,974,016 | A | * | 8/1976 | Bondybey et al. ......... 156/272.8 |
| 4,588,894 | A | * | 5/1986 | Yasuzuka .................. 250/483.1 |
| 4,697,324 | A | * | 10/1987 | Grant et al. ................. 29/419.1 |
| 4,886,108 | A | * | 12/1989 | Utsunomiya et al. ........ 164/461 |
| 5,045,407 | A | * | 9/1991 | Ritter ......................... 428/614 |
| 5,147,086 | A | * | 9/1992 | Fujikawa et al. .......... 228/235.1 |
| 5,271,776 | A | * | 12/1993 | Siemers et al. ............. 29/419.1 |
| 2004/0020904 | A1 | | 2/2004 | Andrees et al. |

FOREIGN PATENT DOCUMENTS

| | | | |
|---|---|---|---|
| GB | 954895 | | 4/1964 |
| JP | 200238666 | * | 9/2000 |
| WO | WO 8806564 | * | 9/1988 |
| WO | WO98/11265 | * | 3/1998 |
| WO | WO 98/11265 | * | 3/1998 |

OTHER PUBLICATIONS

U.S. Appl. No. 11/420,648, filed May 26, 2006, Franchet, et al.
U.S. Appl. No. 11/420,658, filed May 26, 2006, Franchet, et al.
U.S. Appl. No. 11/420,615, filed May 26, 2006, Franchet, et al.
U.S. Appl. No. 11/441,156, filed May 26, 2006, Franchet, et al.

* cited by examiner

*Primary Examiner*—Jessica L Ward
*Assistant Examiner*—Michael Aboagye
(74) *Attorney, Agent, or Firm*—Oblon, Spivak, McClelland, Maier & Neustadt, P.C.

(57) ABSTRACT

A process for manufacturing a bonded sheet with a plurality of coated filaments, which include a ceramic fiber coated with a metal sheath, includes placing the filaments beside one another in one and the same plane, and welding the filaments together by laser spot welding.

17 Claims, 3 Drawing Sheets

PROCESS FOR MANUFACTURING A BONDED SHEET COMPOSED OF CERAMIC FILAMENTS WITH A METAL MATRIX, DEVICE FOR IMPLEMENTING SAID PROCESS, BONDED SHEET OBTAINED BY SAID PROCESS

BACKGROUND OF THE INVENTION

1. Field of the Invention

The invention relates to a process for manufacturing a sheet composed of a plurality of ceramic filaments with a metal matrix and to the bonding together of the filaments.

2. Discussion of the Background

In the field of aeronautics in particular, one constant objective is to optimize the strength of components for a minimum mass and minimum size. Thus, certain components may from now on include an insert made of a metal matrix composite, the component possibly also being monolithic. Such a composite comprises a metal alloy matrix, for example a titanium (Ti) alloy, in the core of which fibers extend, for example silicon carbide (SiC) ceramic fibers. Such fibers have a tensile strength very much greater than that of titanium (typically 4000 MPa compared with 1000 MPa). It is therefore the fibers that take the loads, the matrix in the metal alloy providing a function of binder with the rest of the component and also the function of protecting and isolating the fibers, which must not come into contact with one another. Furthermore, the ceramic fibers are resistant to erosion but necessarily have to be reinforced with metal.

These composites may be used in the formation of disks, shafts, ram bodies, casings, and spacers, such as reinforcements for monolithic components such as blades, etc.

To produce such a composite insert, filaments called "coated filaments", comprising a metal-coated ceramic fiber, are manufactured beforehand. The metal gives the filament the elasticity and the flexibility needed for handling it. Preferably, a very fine carbon or tungsten filament lies at the center of the fiber, along its axis, this carbon filament being coated with silicon carbide, while a thin film of carbon is provided at the interface between the fiber and the metal, in order to provide a diffusion-barrier/buffer function during differential thermal relaxation that occurs as the liquid metal deposited on the fiber cools.

The composite filaments, or coated filaments, may be manufactured in various ways, for example by vapor deposition of metal in an electric field, by electrophoresis using a metal powder, or else by dip-coating ceramic fibers in a bath of liquid metal. A coating process, in which ceramic fibers are dipped into a liquid metal, is presented in patent EP 0 931 846 in the name of the Applicant. Manufacture by this process is rapid.

In the known processes for producing a component with an insert made of a metal alloy matrix composite, the coated filament is formed from a workpiece called a preform. The preform is obtained by winding the coated filament between two metal retaining flanges that extend around a central mandrel. The winding is in a spiral, the preform obtained being in the form of a disk, the thickness of which is that of the coated filament. To ensure cohesion of the preform, the retaining flanges include apertures through which a material providing a bonding function, for example an acrylic resin, is sprayed.

FIG. 1 shows schematically one embodiment of an operation for the manufacture of a component with a composite insert. A plurality of preforms 1, each in the form of a disk, are stacked in a container 2 of cylindrical overall shape. The container has an annular cavity 3, the sectional shape of which, transverse to the axis 4 of the container, is that of the preforms 1. The preforms 1 are stacked until the entire height of the cavity 3 is filled. Typically, 80 preforms are thus stacked. This operation is manual.

It is then necessary to perform a binder-removal operation followed by degassing, so as to eliminate the binder, for example an acrylic resin, from the preforms 1. This is because no contaminating element must remain, when cold and hot, in contact with the titanium during the pressing stage.

An annular lid 5, having a projection 6 of shape complementary to that of the annular cavity, but of smaller axial dimension, is placed on top of the container 2, the projection 6 being brought into contact with the upper preform 1. The lid 5 is welded to the container 2, for example by electron beam welding, the cavity preferably being maintained in a vacuum. The assembly then undergoes hot isostatic pressing. During this operation, the insert composed of juxtaposed coated filaments is compacted and the metal sheaths of the coated filaments being welded together and welded to the walls of the cavity 3 of the container 2 by diffusion, in order to form a dense assembly composed of the metal alloy (for example a titanium alloy) within which the ceramic fibers (for example SiC fibers) extend annularly.

A cylindrical component is obtained that includes an insert made of a composite, resulting from the compaction of the stacked preforms 1. This component may optionally undergo a stress relaxation treatment, making it possible to compensate for the differential expansion between the ceramic fibers and the metal, in which they are embedded, when the assembly cools.

The component is then generally machined. For example, if the objective is to manufacture a one-piece compressor disk—the term "one-piece" meaning that the blades are formed from a single component with the disk—the container, including its composite insert, is machined so as to form a one-piece bladed disk or "blisk", one part of the rim supporting the blades including the composite insert. The rim is of much smaller dimensions than the rims of conventional metal disks, thanks to the high stiffness and high strength values conferred on the assembly by the ceramic fibers of the ceramic composite, contained in the mass of the rim. In particular, such a rim may be in the form of a simple ring.

This process for manufacturing a component with a composite insert has drawbacks, and is difficult to exploit on an industrial scale owing to the length, complexity and precision required of its steps.

Firstly, since the ceramic fibers are brittle, the operations on the coated filaments must above all prevent any contact between them, and the welding of coated filaments has not been envisaged hitherto.

Furthermore, the binder-removal and degassing operations are lengthy, and there is never certainty that all of the binder has been removed. To ensure complete disappearance of the binder, necessary in particular for the correct subsequent behavior of the titanium alloy, several binder-removal and degassing steps are needed. This lengthens the total duration of the process and increases its overall cost.

In addition, should the filament break while it is being wound between the two flanges, it is necessary to form a new preform in so far as at the present time no means exist for solving the problem and resuming the winding.

Moreover, the step of positioning the coated filament preforms in the container is currently manual. The cost of the operation and in particular its precision are affected thereby. Now, the positioning of the coated filament in the container is a critical factor in the manufacturing sequence in so far as it determines the performance of the composite, with a very great influence of the orientation of the ceramic fiber according to the principal stresses of the component. It also determines the quality of the composite, by preserving the integrity of the ceramic fiber, during the various steps in the manufacture of the component. Lastly, it determines the final cost of the component, again because the operations of positioning the coated filaments are relatively lengthy and carried out manually. The positioning of the filaments in the container should therefore benefit from being improved.

Also known is a process that comprises the formation of a sheet of a plurality of metal filaments side by side, in which the filaments, placed parallel to one another and in mutual contact, are made to pass between two rolls forming a rolling mill. This forces the filaments to be bonded together. Such a process cannot easily be applied to coated filaments such as those used in the formation of a component with an insert made of a composite in accordance with the invention, since these coated filaments include a very brittle ceramic fiber at their center, which runs the risk of being broken by the lack of precision of such a process. Such a break would nullify all the advantages associated with the presence of ceramic fibers within the composite insert. In addition, this process, necessarily carried out hot, results in contamination of the surface of the titanium sheath, which necessarily then has to be removed.

SUMMARY OF THE INVENTION

The object of the invention is to provide a process for constituting a sheet of coated filaments that can be implemented reliably and on an industrial scale, which sheet can be handled and used in a process for forming a component that includes an insert made of a composite.

According to the invention, this object is achieved with a process for manufacturing a sheet comprising a plurality of coated filaments, which comprise a ceramic fiber coated with a metal sheath, characterized in that the filaments are placed beside one another in one and the same plane, and the filaments are welded together by laser spot welding.

The process of the invention makes it possible to produce a semifinished product that can be easily handled and worked. The rigidity of the bonded sheet is controlled by the spacing between the fastening points. Furthermore, laser welding allows spot welds to be produced very accurately, this being important so as not to damage the ceramic fibers. Finally, the method can be readily automated and makes this technique economically advantageous.

More particularly, the filaments are run past a laser welding device, which forms spot welds aligned in segments perpendicular to the run direction of the filaments, or else in a zig-zag pattern. The reverse situation may also be true, in which it is the welding device that moves relative to the sheet of filaments. The filaments may be stationary during formation of a segment of spot welds.

BRIEF DESCRIPTION OF THE DRAWINGS

The invention will be more clearly understood and other features will emerge on reading the description that follows of the implementation of the process of the invention with reference to the appended drawings in which.

DETAILED DESCRIPTION OF THE PREFERRED EMBODIMENTS

First, a plurality of coated filaments are formed according to one of the known techniques, preferably by a coating process in which ceramic fibers are dipped into a bath of liquid metal. These filaments are each wound onto a bobbin. Each filament has for example a diameter of 0.2 to 0.3 mm.

Figure 1:
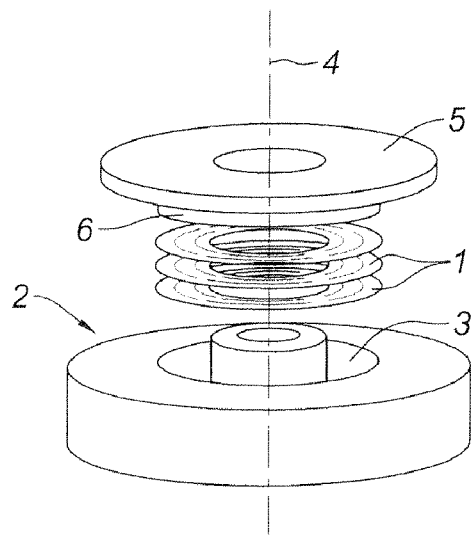
FIG. 1 shows a schematic perspective view of an operation for manufacturing a component with a composite insert of the prior art.
Figure 2:
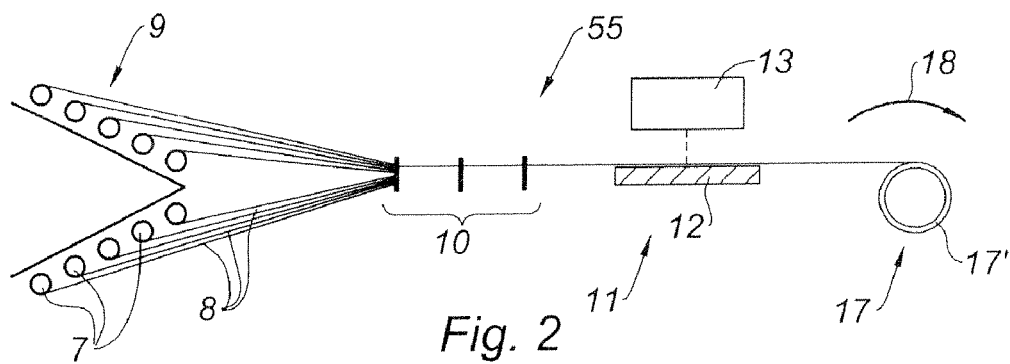
FIG. 2 shows a schematic view of a device for forming a sheet of coated filaments for implementing a process for manufacturing a sheet of coated filaments according to the invention.

Referring to FIG. 2, a plurality of bobbins 7, each with a coated filament 8 wound around its circumference, is placed on a module 9 of bobbins 7. This module 9 makes it possible to place the bobbins 7 in such a way that they can be unwound toward a warping module, presented below, without the filaments 8 crossing one another. In this case, the bobbin module 9 has a structure in the form of an isosceles triangle supporting the bobbins 7, one half of them along one side of the triangle and the other half along the other side, the apex of the triangle being directed on the side to which the filaments 8 are unwound from the bobbins 7, toward a point located on the axis of symmetry of the triangle that forms the structure of the bobbin module 9.

In another embodiment, each bobbin 7 may support a bundle—or array—of coated filaments. Thus, to form a sheet of one hundred coated filaments, ten bobbins 7, each having a bundle of ten coated filaments wound around its circumference, may be used.

The coated filaments 8 are unwound toward a warping module 10. This warping module 10 is shown here in a schematic and undetailed manner as its structure is accessible to a person skilled in the art. It is comparable to a warping module used in the weaving field. The warping module 10 includes guiding means allowing the filaments 8 to be stretched parallel to one another, as a layer in one and the same plane, without mutual overlap in contact with one another. The objective is to form a flat sheet of parallel filaments 8 in contact with one another.

The filaments 8 thus warped are driven into a laser welding module 11. This module includes a flat support 12 over which the filaments 8 move, above which support a laser welding device 13 is mounted. The filaments 8 are therefore driven past the laser welding device 13. The whole assembly is preferably contained in an inert atmosphere, for example an atmosphere of argon injected via a nozzle. The laser welding device 13 may for example comprise a neodymium (Nd)-doped YAG (yttrium aluminum garnet) laser, which has the advantage of high precision with respect to its power and to the point of impact of its laser beam, and also the advantage of having a very fine beam. The laser will here preferably have a power of between 2 and 5 W.

Downstream of the laser welding module 11, the filaments 8 are driven by a module 17 for pulling the filaments 8, from the bobbin module 9, translationally over the support 12. This drive module 17 comprises in this case a rotating bobbin 17' around which the filaments 8 are wound. The bobbin 17' is rotated as shown by the arrow 18. Thus, the filaments 8 are driven from their bobbin 7 of the bobbin module 9 along the warping module 10 and the laser welding module 11 by the drive module 17, the whole assembly forming a device 55 for forming a bonded sheet of coated filaments 8. The bonded sheet is wound up onto the bobbin 17' of the drive module.

Figure 5:
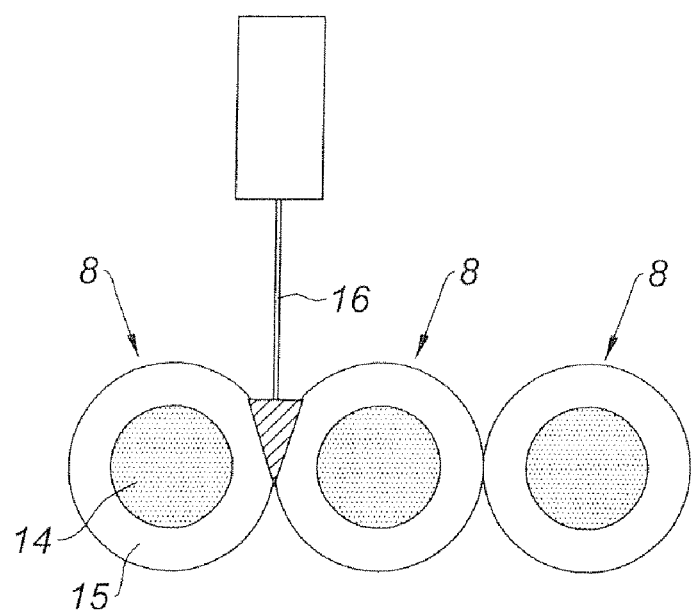
FIG. 5 shows a sectional schematic view, in a plane transverse to the direction in which the coated filaments run, at the laser welding module of the device of FIG. 2, for welding two filaments together.

FIG. 5 shows a sectional representation, in a plane transverse to the direction in which the filaments 8 run, at the laser welding module 11 for welding two filaments 8 together. The welding is carried out by spot welding using the laser welding device 13. Each filament 8 is joined to its neighbors by a plurality of spot welds. Each filament 8 comprises, as was seen previously, a ceramic fiber 14 coated with a metal sheath 15, for example one made of a Ti alloy. The laser beam is directed, as indicated by the arrow 16, in the direction of a contact point between two successive filaments 8, perpendicular to the plane containing all the axes of the filaments 8 driven along the support 12. This results in local melting of their metal sheath 15. The laser is used at low power, but highly concentrated, so as to ensure that the ceramic fiber 14 is not affected by this local melting. A minimum volume of the metal sheath 15 is melted. It is sufficient to ensure that the filaments 8 are joined together at this point. The welding parameters are optimized in such a way that the weld pool resulting from the melting of the metal does not flow out.

It is important for the laser beam to be directed along a point region overlapping two filaments 8, perpendicular to the plane of the filaments 8, so that it does not damage the ceramic fibers 14, the integrity of which is a condition necessary for the operation that is assigned thereto, in the application to the formation of a component with a composite insert.

It is unnecessary for the spot welds to be very strong. Their function is solely to ensure overall consolidation, or mutual retention, of the filaments 8 for the purpose of forming a bonded sheet. This consolidation must just be strong enough to allow the sheet to be handled, and possibly wound and unwound, for the purpose for example of constituting a component with a composite insert. The welding is therefore just to keep the filaments 8 together.

Figure 3:
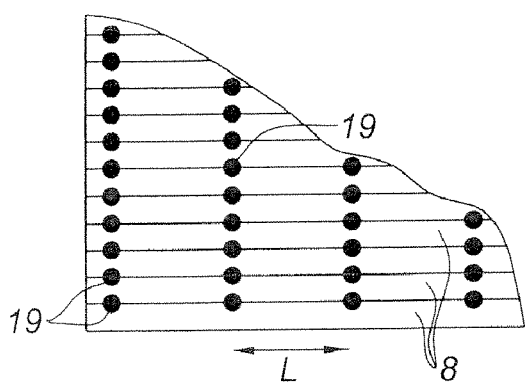
FIG. 3 shows a schematic view from above of a sheet formed according to a first operating mode of the device of FIG. 2.
Figure 4:
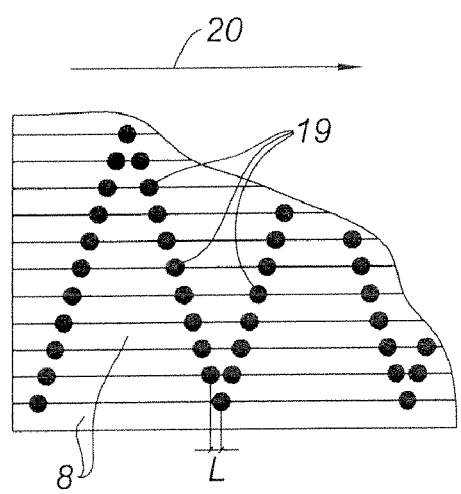
FIG. 4 shows a schematic view from above of a sheet formed according to a second operating mode of the device of FIG. 2.

FIGS. 3 and 4 show schematically two envisaged operating modes for the laser welding module 11, in this case for the formation of a sheet comprising twelve coated filaments 8.

In the operating mode in FIG. 3, when the coated filaments 8 are located beneath the laser welding device 13, the drive module 17 is stopped so as to leave the filaments 8 stationary. The welding device 13 then produces a series of spot welds between the adjacent filaments 8, along a segment perpendicular to the direction in which they run beneath the welding device 13. For this purpose, the welding device 13 makes a first spot weld 19 between two filaments 8, as explained above with reference to FIG. 5. It is then stopped and moved, perpendicular to the run direction of the filaments 8, so as to be in line with the next contact point between two filaments 8, which it welds in a second spot weld 19, and so on, until all the filaments 8 have been joined together along this displacement segment. The welding device 13 therefore makes a segment of spot welds 19, perpendicular to the run direction of the filaments 8 beneath the welding device 13. The drive module 17 is then actuated so as to make the filament 8 run over a length "L" past the welding device 13 and then the operation is repeated on another segment, parallel to the first one.

In the operating mode shown in FIG. 4, the filaments 8 are driven continuously, in the run direction and sense that are shown by the arrow 20, this movement being imposed by the drive module 17. The welding device 13 performs the same operations as previously, namely a welding operation, and then the displacement toward the next point along a path perpendicular to the direction 20 in which the filaments 8 move, etc., from the first filament 8 to the last one, and then in the reverse manner. If the speed of movement of the filaments 8 is low enough, the welding of the spot welds 19 between two moving filaments 8 is possible. A series of spot welds 19 is therefore produced between the filaments 8, which forms a zigzag over the sheet formed by the filaments 8.

It is also possible to obtain such a distribution of the zig-zagged spot welds 19 by stopping the drive module 17 when welding each spot weld 19, the drive module 17 driving the filaments 8 over a short distance "1" between each spot weld 19, while the welding device 13 is moved.

It is also possible to operate with only the movement of the filaments 8 being slowed down at the moment of forming the spot welds 19.

The advantage of such a distribution of the spot welds 19 is its greater uniformity over the surface of the sheet formed by the filaments 8.

Whatever the case, on leaving the laser welding module 11, the filaments 8 are in the form of a bonded sheet within which they are joined together at the retaining spot welds 19. The sheet is wound up onto the bobbin 17' of the drive module 17.

Reference has not been made here to the set-up phase of the process for manufacturing a bonded sheet of coated filaments 8. This phase may be freely adapted by those skilled in the art, for example by winding, at the start of the process, the filaments 8 onto the bobbin 17' without them being joined together, the innermost portion of the final wound sheet therefore not being in sheet form, or for example by driving the filaments at the start of the process using another drive device and by connecting them to the bobbin 17' when they start to be in the form of a sheet.

The distance "L" between the segments of spot welds 19 within the context of the segment configuration shown in FIG. 3, or else the longitudinal distance "1" between two successive spot welds 19, in the zigzag configuration shown in FIG. 4, is set according to the desired rigidity of the sheet of coated filaments 8. Thus, for a rigid sheet, the spot welds 19 will be close together, while for a flexible sheet, the spot welds 19 will be further apart. Other configurations of distribution of spot welds 19 are of course conceivable. The configuration and the spacings of the spot welds 19 will be chosen according to the application to which the bonded sheet is intended, especially if it has to be coiled, twisted, etc., while still respecting a minimum space so as to ensure cohesion of the whole assembly under the defined conditions of the application. The specifications relating to the configuration of the distribution of the spot welds 19 are less dependent on the process itself than on the application to which the sheet of coated filaments 8 is intended.

Thanks to the speed of execution of the laser welding and its precision, it is possible to manufacture a bonded sheet of coated filaments 8, the filaments 8 being joined together, in an automated system, on an industrial scale, in order to implement the process that has just been described. Large quantities of sheets of coated filaments 8 are thus rapidly obtained—it is possible to form several kilometers of the same sheet—in a form that can be exploited in various ways. Moreover, the sheets are bonded together by melting of the metal sheath 15 of the filaments 8, and therefore without addition of material, especially without the addition of a binder such as an adhesive, thereby making it possible to eliminate, in a more general process for forming a component with a composite insert using coated filaments, all the binder-removal steps.

An example of application of the sheet formed according to the invention will be described below.

Figure 6:
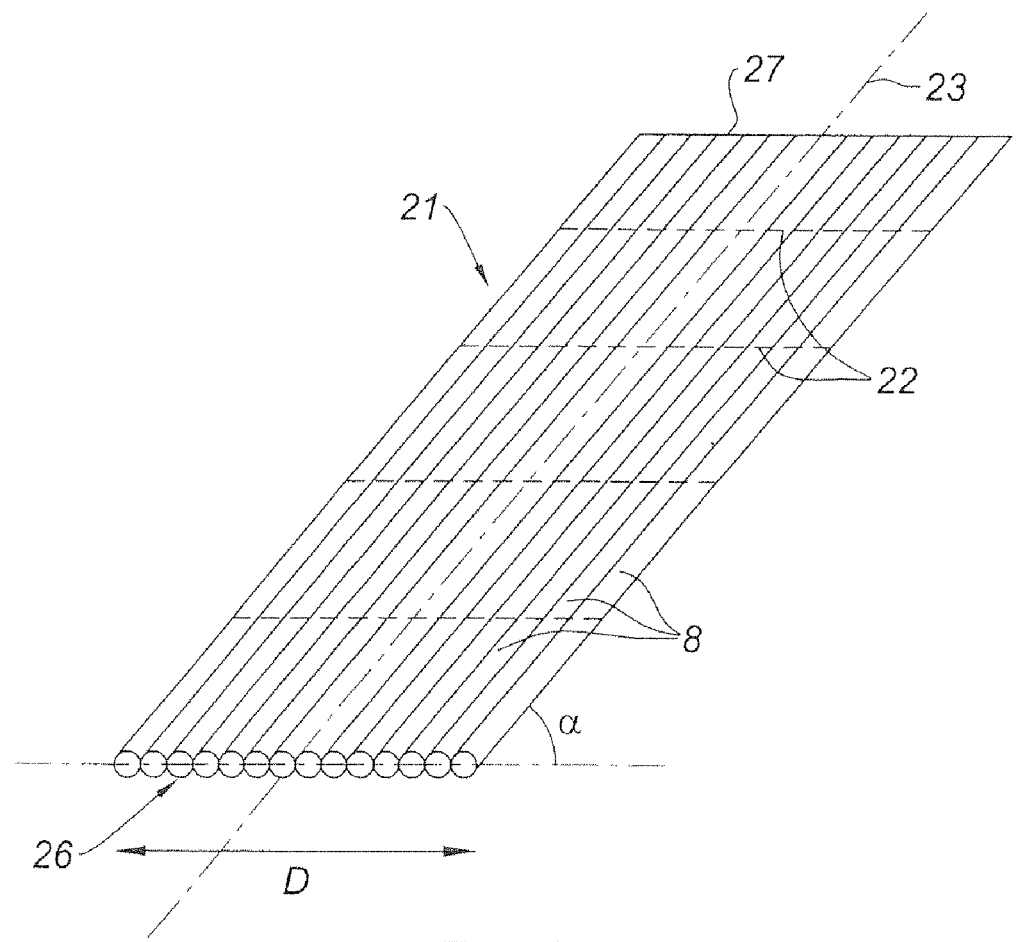
FIG. 6 shows a schematic perspective view of a sheet of coated filaments produced in accordance with the invention.

Referring to FIG. 6, a sheet 21 of coated filaments 8 has therefore been formed, said sheet comprising here fourteen mutually parallel filaments fastened together by a method of forming a sheet as shown in FIG. 3. Thus, the filaments 8 are joined together by spot welds extending along segments 22 that are parallel to each other and perpendicular to the overall axis 23 of the sheet 21 (i.e. perpendicular to the axes of the filaments 8 when the latter extend in a linear fashion). The ends of the sheet 21 are beveled so as to obtain end segments 26, 27 of width "D" making an angle "α" with the axis 23 of the sheet 21.

Figure 7:
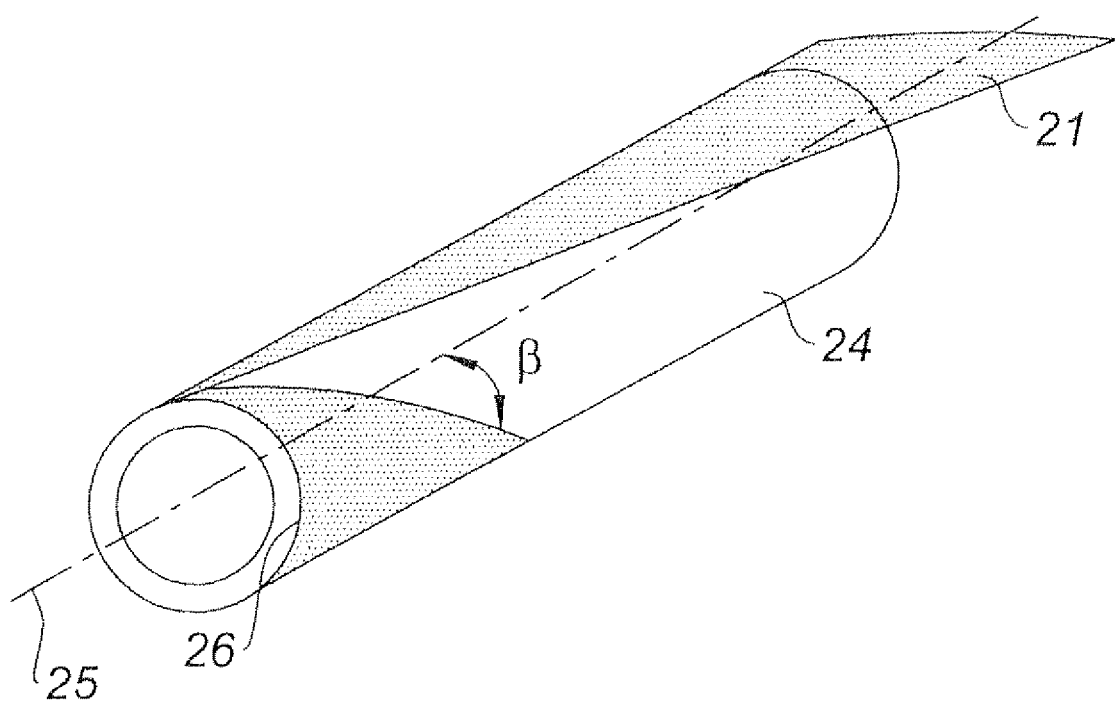
FIG. 7 shows a schematic perspective view of the laying-up of the sheet of FIG. 6 around a mandrel, within the context of an application of the sheet obtained according to the invention.

Referring to FIG. 7, the sheet 21 thus beveled is draped, or laid up, around a cylindrical mandrel 24. This mandrel 24 is a hollow metal tube, preferably made of the same metal as that with which the ceramic fibers of the coated filaments 8 are coated, here a titanium alloy. It has a circular external perimeter, the value of which is equal to the value of the width "D" of the beveled ends of the sheet 21. The sheet 21, prior to draping, is wound, via one of its end segments 26, around one end of the mandrel 24, and then draped helically around the mandrel 24, helical draping being possible because of the angle α between the axis 23 of the sheet 21 and the segments 26, 27 forming the beveled ends of the sheet 21, especially the segment 26, which is wound beforehand around one end of the mandrel 24. The longitudinal edges of the sheet 21 make an angle β (where $\beta=\pi/2-\alpha$) to the axis 25 of the mandrel 24. The sheet 21 is draped all around the mandrel 24, completely covering its external surface, without the coated filaments 8 of the sheet 21 overlapping one another. The longitudinal edges of the sheet 21 are brought into contact with one another in succession at each turn of the draping. Finally, the sheet 21 has been designed and its end segments 26, 27 beveled in such a way that its dimensions correspond to the developed area of the mandrel 24.

Depending on the thickness of the insert made of a metal matrix composite that is desired in the final component, it is possible to drape a plurality of sheets 21 around the mandrel 24, one after another. Preferably, when one sheet is draped around the previous sheet 21, its initial position at the end of the mandrel 24 is such that, once the new sheet has been draping, each of its coated filaments 8 extend between two coated filaments 8 of the previous sheet, in a staggered fashion, thereby ensuring better compactness of the assembly. Moreover, it is possible to offset the sheets 21 angularly so that, in addition, the curves along which their longitudinal edges join are offset from one another, preferably as far apart as possible (each curve defining the contact between two longitudinal edges may for example lie equidistantly from the two proximal curves of the preceding sheet). It goes without saying that the dimensions of each new sheet 21 must be adjusted according to the number of sheets 21 that have already been draped. The number of filaments making up each additional sheet can be readily calculated, knowing the dimensions of the individual filaments, the perimeter of the mandrel and the number of layers already draped. Preferably, the end of the mandrel 24, where the sheets 21 were initially positioned and wound, has a rim forming an axial stop, of radial dimension, either equal to the thickness of the total number of sheets 21, or greater than this. The same may apply to the other end.

The angle α is determined by a person skilled in the art according to the stresses and various stressing (centrifugal, tensile, torsional, compressive, etc.) modes to which the final component will be subjected. It is mainly the ceramic fibers that will take up the forces, their orientation and their distribution having a key influence on the behavior of the component. It is thus possible to adapt the angle α, the diameter of the coated filaments 8, the diameter of the ceramic fibers, etc. according to the application in question. In the particular case considered here, α is set at 45°.

Optionally, if a number of sheets 21 are draped around the mandrel 24, different angles α may be provided for these sheets 21. However, in this case, it is recommended to use coated filaments 8 whose metal sheath is thicker, so as to properly protect the ceramic fibers lying within them.

In order to drape the sheets 21, the latter are fastened either to the mandrel 24, if this is the first sheet 21, or to the preceding sheet, if this is a final sheet 21, at the start of draping when the end 26 of the sheet 21 is wound around the end of the mandrel 24 or of the preceding sheet. The draping is continued and the other end of the sheet 21 is fastened to the whole assembly in a similar manner. Preferably, a contact welding method is used, by contact between two electrodes and passage of a medium-frequency current to weld a thin band of the end portions of the sheet 21. Any other method may be employed.

According to another method of implementation, a sheet 21 may be welded to the mandrel 24 or to the sheet along a longitudinal line relative to the mandrel 24, preferably using a contact welding method, by contact between two electrodes and passage of a medium-frequency current.

Once the desired number of sheets 21 have been draped around the mandrel 24, the whole assembly is inserted into a sheath, having an internal diameter equal to the external diameter of this assembly. Preferably, this sheath is made of the same metal alloy as that with which the fibers of the coated filaments 8 are coated, here a titanium alloy. The sheath is complementary with the rims forming the axial stops of the mandrel 24 in such a way that the assembly, which is preferably plugged at each of its ends by circular metal plates, is homogeneous and in the form of a cylinder. The circular plates and the sheath are preferably welded by electron beam welding so as to constitute a sealed container. These plates are preferably made of a titanium alloy. The electron beam welding allows a vacuum to be created beforehand inside the sheath. The assembly formed is then compacted by hot isostatic pressing.

During the hot isostatic pressing, which is carried out for example at a pressure of 1000 bar at 950° C., the titanium alloy is made to diffuse and to create the metal matrix of the composite, within which the ceramic fibers extend. Since the titanium alloy is viscous at high temperature, it permits good diffusional flow of the material, without damaging the ceramic fibers, during formation of the metal matrix. Thus, a shaft is obtained that has an internal titanium alloy thickness corresponding to the mandrel 24, a central insert made of a composite having a titanium alloy matrix, in which the ceramic fibers extend in a helical manner, and an external titanium alloy thickness corresponding to the sheath.

This shaft may be machined according to the final component desired. Preferably, the ends of the shaft, with the metal plates and one or both of the optional axial stop rims for the sheets are removed so as to obtain a shaft that is uniform over its entire length. Such a shaft has the advantage of very good resistance to the forces owing to the composite insert, which allows the total thickness of its wall to be substantially smaller than that of conventional shafts. This small thickness implies, apart from a considerable weight saving, a smaller size, which is useful in applications requiring the presence of many coaxial shafts.

The process for manufacturing a sheet of coated filaments, described in the present application, also makes it possible to implement a process for forming a component with an insert of coated filaments, directly by winding a sheet around a mandrel and then by compacting the assembly. The component thus formed, which includes an insert, is obtained much more rapidly than by the processes of the prior art using a preform.

Finally, the process for forming sheets of coated filaments of the present application allows an intermediate product—the sheet—to be obtained, which can be used in many applications. This intermediate product allows the processes to be implemented very rapidly.

The invention claimed is:

1. A process for manufacturing a bonded sheet comprising a plurality of coated filaments, wherein each filament comprises a ceramic fiber coated with a metal sheath so that said coated filaments include a plurality of ceramic fibers, said process comprising:

placing the filaments beside one another in one and a same plane such that the metal sheath of each filament contacts the metal sheath of an adjacent filament, and welding the filaments together by laser spot welding by directing a laser beam perpendicularly to said plane in which said filaments are placed and toward contact points between two adjacent filaments so that said laser beam is perpendicular to said adjacent filaments at said contact points, wherein said laser spot welding is performed by sequentially exposing contact points of different pairs of adjacent filaments to said laser beam thereby forming an interrupted weld across a transverse direction of said bonded sheet.

2. A process according to claim 1, wherein said welding step is performed by running the filaments past a laser welding device so as to form spot welds aligned in segments perpendicular to a direction in which the filaments run.

3. A process according to claim 2, wherein said welding step is performed while maintaining the filaments stationary during formation of a segment of spot welds.

4. A process according to claim 1, wherein said welding step is performed by running the filaments past a laser welding device so as to form spot welds arranged in a zig-zag pattern on the bonded sheet.

5. A process according to claim 4, wherein said welding step is performed by running the filaments continuously past the laser welding device.

6. A process according to claim 4, wherein said welding step is performed while maintaining the filaments stationary during formation of a spot weld.

7. A process according to claim 2, further comprising, prior to the filaments running past the laser welding device, running the filaments through a warping module.

8. A process according to claim 2, further comprising driving the filaments by a rotating bobbin.

9. A process according to claim 2, further comprising driving the filaments from a bobbin module, each bobbin of the module having a wound coated filament or a bundle of coated filaments.

10. A process according to claim 1, further comprising adjusting the rigidity of said bonded sheet by adjusting a distance between successive weld spots.

11. A process according to claim 1, wherein said process is free of any step of adding a binder throughout said manufacturing of said bonded sheet.

12. A process according to claim 1, wherein said process is free of any step of removing a binder throughout said manufacturing of said bonded sheet.

13. A process according to claim 1, further comprising a step of adjusting welding parameters of said laser spot welding such that weld pools at said contacts point do not flow out.

14. A process for manufacturing a tubular component according to claim 1, wherein said laser spot welding is performed in an inert atmosphere.

15. A process for manufacturing a tubular component according to claim 14, wherein said laser spot welding is performed in an argon atmosphere.

16. A process according to claim 1, further comprising a step of winding the welded filaments, and wherein said process is free of a step of pressing said filaments with rollers between said welding step and said winding step.

17. A process according to claim 1, wherein said laser spot welding is concentrated at said contact points such that said laser beam is not directed toward said ceramic fibers and such that said ceramic fibers are not affected by a local melting of the metal sheath caused by said laser beam at said contact points.

* * * * *